US008936436B2

(12) United States Patent
Stamps et al.

(10) Patent No.: US 8,936,436 B2
(45) Date of Patent: Jan. 20, 2015

(54) ROTOR-BLADE CONTROL SYSTEM AND METHOD

(75) Inventors: Frank B. Stamps, Colleyville, TX (US); Richard E. Rauber, Euless, TX (US)

(73) Assignee: Textron Innovatons Inc., Providence, RI (US)

( * ) Notice: Subject to any disclaimer, the term of this patent is extended or adjusted under 35 U.S.C. 154(b) by 688 days.

(21) Appl. No.: 13/144,433

(22) PCT Filed: Jan. 19, 2009

(86) PCT No.: PCT/US2009/031388
§ 371 (c)(1),
(2), (4) Date: Jul. 13, 2011

(87) PCT Pub. No.: WO2010/082937
PCT Pub. Date: Jul. 22, 2010

(65) Prior Publication Data
US 2011/0280727 A1    Nov. 17, 2011

(51) Int. Cl.
  *B64C 11/06*    (2006.01)
  *B64C 27/605*   (2006.01)
  *B64C 27/32*    (2006.01)
(52) U.S. Cl.
  CPC ............... *B64C 27/32* (2013.01); *B64C 27/605* (2013.01)
  USPC .......................................... 416/114; 416/148
(58) Field of Classification Search
  USPC ........................... 416/114, 115, 141, 147, 148
  See application file for complete search history.

(56) References Cited

U.S. PATENT DOCUMENTS

| 2,810,443 A | 10/1957 | Doman |
| 2,980,187 A | 4/1961 | Smyth-Davila |
| 3,139,937 A | 7/1964 | Derschmidt |
| 3,246,862 A | 4/1966 | Celniker |
| 6,074,168 A | 6/2000 | Rampal |
| 2006/0237581 A1 | 10/2006 | Gerbino |

OTHER PUBLICATIONS

Extended European Search Report issued by the European Patent Office in corresponding application 09838519.8-2422 dated Aug. 10, 2012, 6 pages.
First Office Action issued by the Chinese Patent Office from corresponding application 2009801548468 Dated Jun. 25, 2013.
International Search Report mailed by ISA/USA, U.S. Patent and Trademark Office on Mar. 3, 2009 for International Patent Application No. PCT/US09/31388.
International Preliminary Report on Patentability mailed by IPEA/USA, U.S. Patent and Trademark Office on Mar. 21, 2011 for International Patent Application No. PCT/US09/31388.
Office Action from corresponding Chinese Application No. 200980154846.8 issued by the Chinese Patent Office dated Mar. 4, 2014.

*Primary Examiner* — Dwayne J White
(74) *Attorney, Agent, or Firm* — James E. Walton; Damon R. Hickman

(57) ABSTRACT

A blade-pitch control system has a swashplate configured for continuous rotation with an associated rotor and mast, and at least one link connects the swashplate to each blade of the rotor. The swashplate provides for collective control of the pitch angle of the blades through selective rotation of the swashplate about a swashplate axis while the swashplate is rotating with the rotor and mast. The system can be configured to provide for cyclic control of the pitch angle of the blades through planar translation of the swashplate or through tilting of the swashplate about axes generally perpendicular to the swashplate axis.

12 Claims, 12 Drawing Sheets

ROTOR-BLADE CONTROL SYSTEM AND METHOD

TECHNICAL FIELD

The technical field is control systems for rotors.

DESCRIPTION OF THE PRIOR ART

Rotary-wing aircraft, such as helicopters and tiltrotors, have at least one rotor for providing lift and propulsion forces. These rotors have at least two airfoil blades connected to a hub, and the hub is mounted on a rotatable mast driven in rotation by an engine. These blades may be adjustable for pitch angle, and the pitch angle is typically controlled by a swashplate assembly and linkage for connecting a rotating portion of the swashplate assembly to each blade.

One example of a prior-art system includes a swashplate movable in directions parallel to the mast axis toward and away from the rotor for collective control and tilts about axes perpendicular to the mast axis for cyclic control. When the swashplate moves toward or away from the rotor, the pitch angle of each blade changes by the same amount, and in the same direction, as each other blade. This collective control system, which is often referred to as a "rise and fall" system, provides for control of the thrust of the rotor, which is measured generally coaxial to the mast. On the other hand, tilting of the swashplate causes the pitch of each blade to change sinusoidally, or cyclically, as the rotor rotates, which causes the rotor to develop lift forces that vary across the plane of the rotor.

DESCRIPTION OF THE PREFERRED EMBODIMENT

A blade-pitch control system is provided for a rotor having multiple blades that are each adjustable for pitch angle. Each blade is connected to a rotating swashplate of a swashplate assembly, and the rotating swashplate is configured for rotational indexing relative to the mast during rotation with the mast for collective pitch control of the blades.

Figure 1:
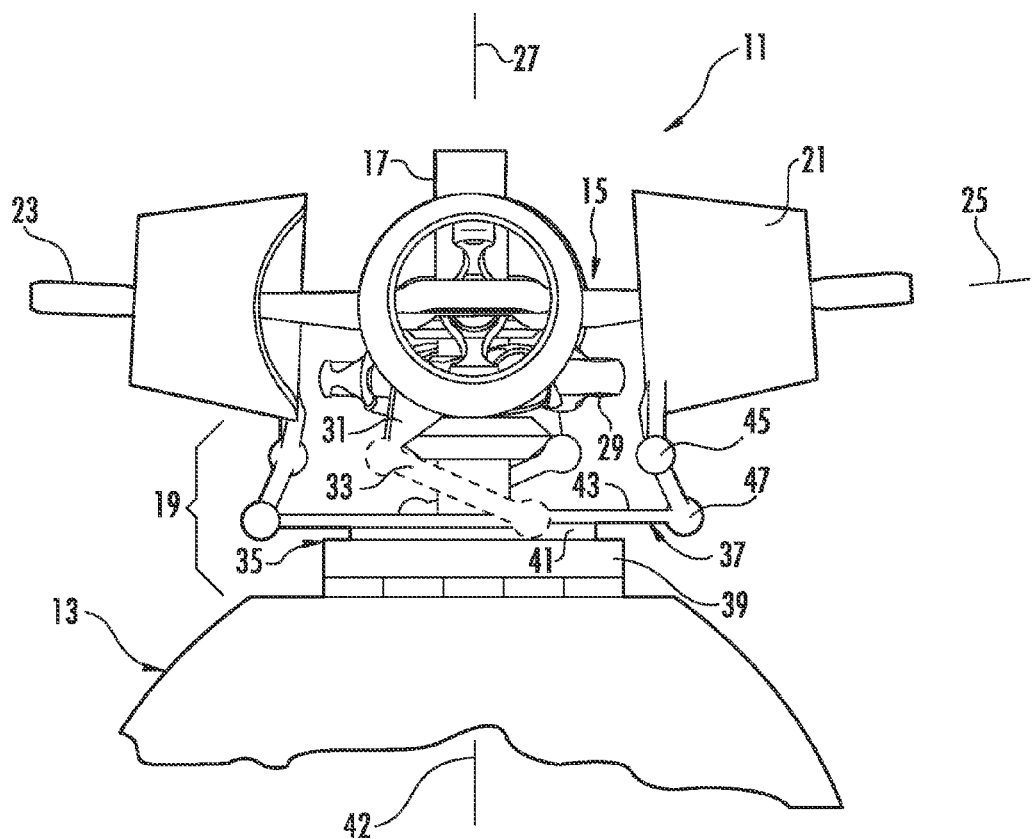
FIG. 1 is a side view of a rotor hub assembly installed on an aircraft, the hub assembly comprising a rotor hub, mast, and an embodiment of a blade-pitch control system.

FIG. 1 is a side view of a rotor hub assembly 11 installed on a rotary-wing aircraft 13, such as a helicopter or tiltrotor, with hub assembly 11 comprising a rotor hub 15, mast 17, and an embodiment of a blade-pitch control system 19 for controlling the pitch of blade grips 21. Rotor blades (not shown) are attached to grips 21 (only inner portions are shown), and each blade and grip 21 are rotatably attached to a yoke 23 to allow for adjustability of pitch angle about a corresponding pitch axis 25. To allow for mast 17 to rotate yoke 23 about mast axis 27, yoke 23 is attached to mast 17 with a constant-velocity joint assembly 29, which allows yoke 23 to gimbal relative to mast 17 while mast 17 drives yoke 23 in rotation. While shown as being configured for four blades, other embodiments of rotor hub assembly 11 may be configured for any number of blades.

Each grip 21 has a pitch horn 31 extending generally radially from grip 21, and a pitch link 33 connects each pitch horn 31 to a rotating portion of a swashplate assembly 35. As described herein, pitch horns 31 are located on the trailing side of blade grips 21, so that an upward motion of pitch horn 31 causes a reduction of pitch angle for the attached blade, and a downward motion causes an increase of pitch angle for the attached blade. Swashplate assembly 35 comprises a rotating swashplate 37 and a non-rotating swashplate 39, rotating swashplate 37 being rotatably connected to non-rotating swashplate 39 by bearings 41. Bearings 41 allow one degree of freedom between swashplate 37 and swashplate 39, with swashplate 37 being able to rotate relative to swashplate 39 about a swashplate axis 42. As shown in the figure, swashplate axis 42 is coaxial with mast axis 27 when swashplate assembly 35 is in a nominal orientation. Rotating swashplate 37 continuously rotates relative to aircraft 13 about swashplate axis 42 and with mast 17 and rotor hub 15 as hub assembly 11 is driven in rotation by mast 17. Non-rotating swashplate 39 does not rotate continuously relative to aircraft 13 about swashplate axis 42. Links 33 connect each pitch horn to one of a plurality of arms 43 extending generally radially from rotating swashplate 37. To allow for relative movement between links 33 and pitch horns 31 and between links 33 and arms 43, links 33 are pivotally connected to both pitch horns and arms 43 at joints 45, 47, respectively. Though shown as extending generally radially outward, arms 43 and pitch horns 31 may be formed to have alternative configurations for achieving desired packaging or kinematic requirements.

Figure 2:
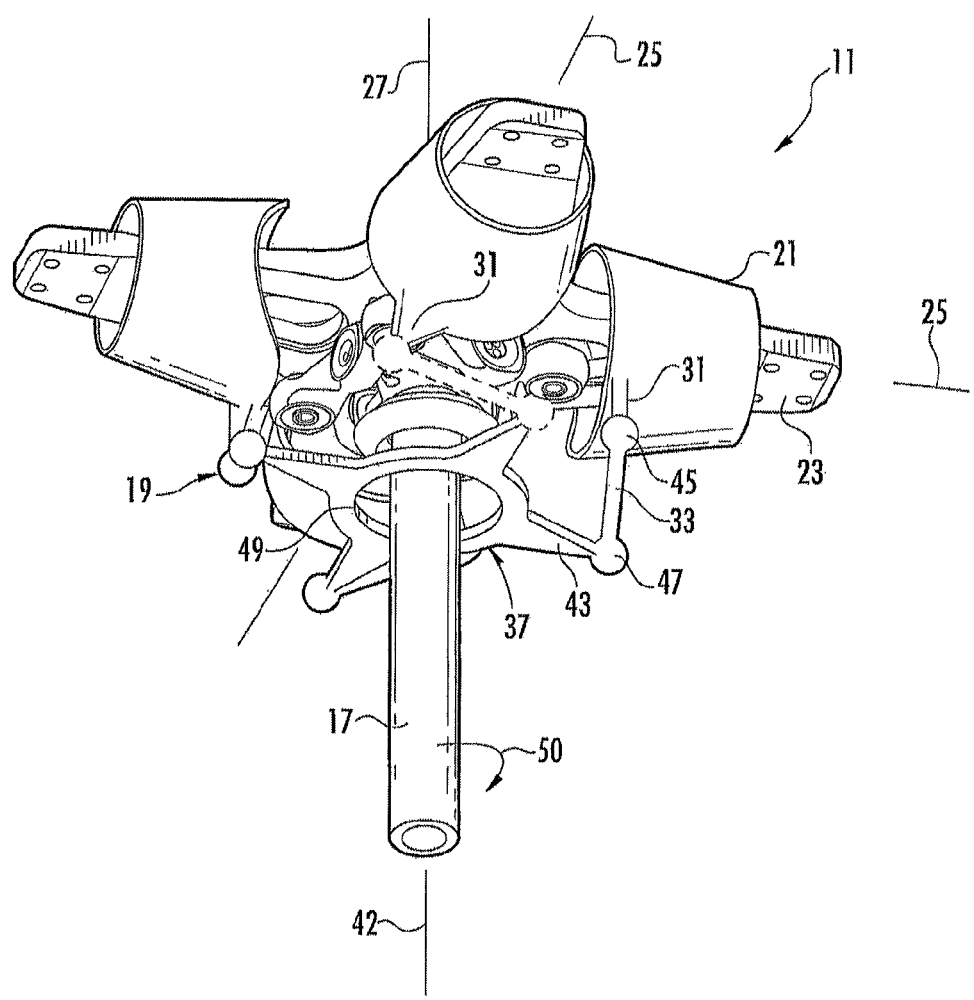
FIG. 2 is an oblique view of the rotor hub assembly of FIG. 1 with a portion of the blade-pitch control system removed.

FIG. 2 is an oblique view from below rotor hub assembly 11, with non-rotating swashplate 39 removed for ease of viewing. Mast 17 extends through an aperture 49 in rotating swashplate 37, and the relatively large size of aperture 49 allows for translation and/or tilting of swashplate 37 relative to mast 17. The preferred direction of rotation of assembly 11 is shown by arrow 50.

Figure 3:
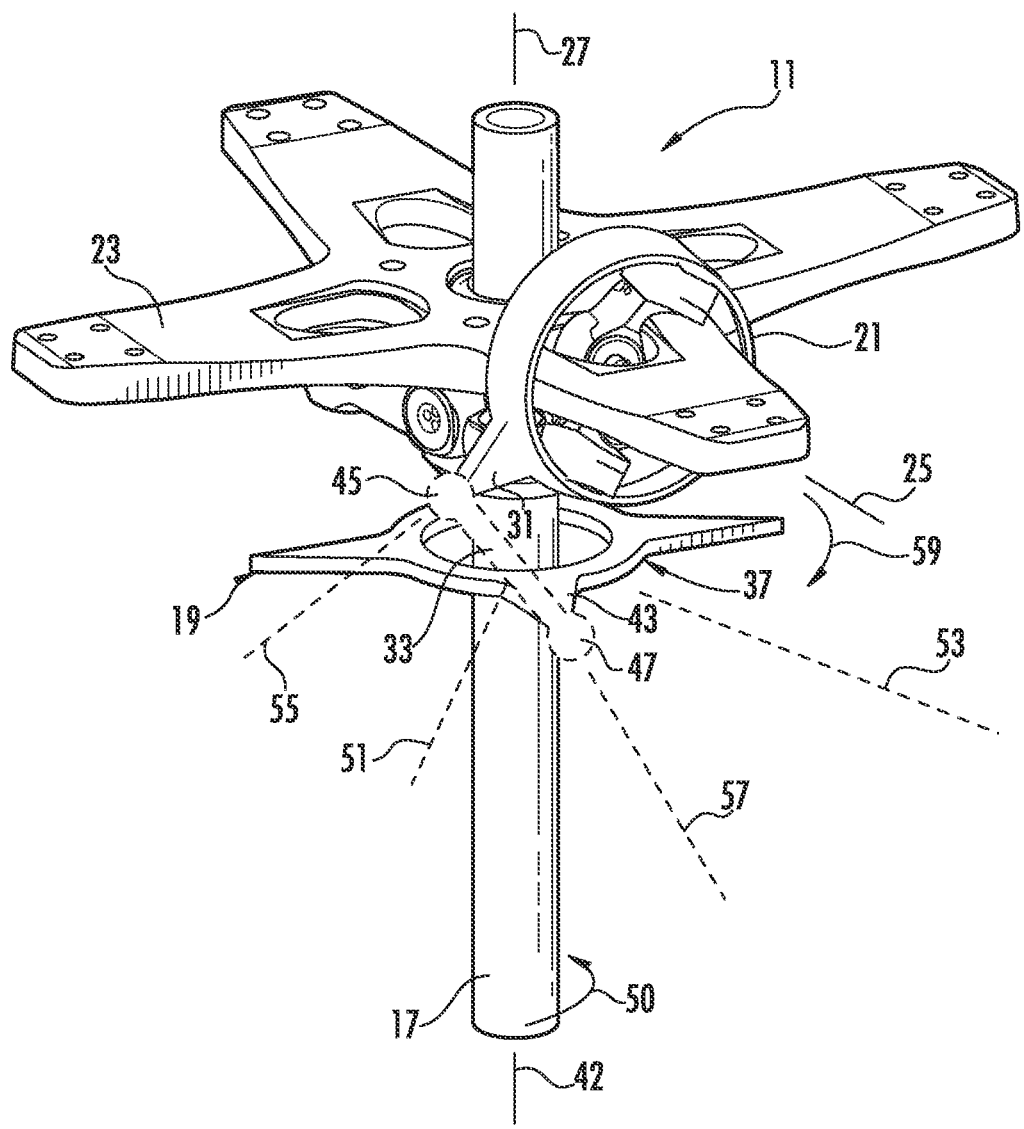
FIG. 3 is an oblique view of the rotor hub assembly of FIG. 1 with portions of the assembly removed, the blade-pitch control system being shown in a minimum-pitch collective position.
Figure 4:
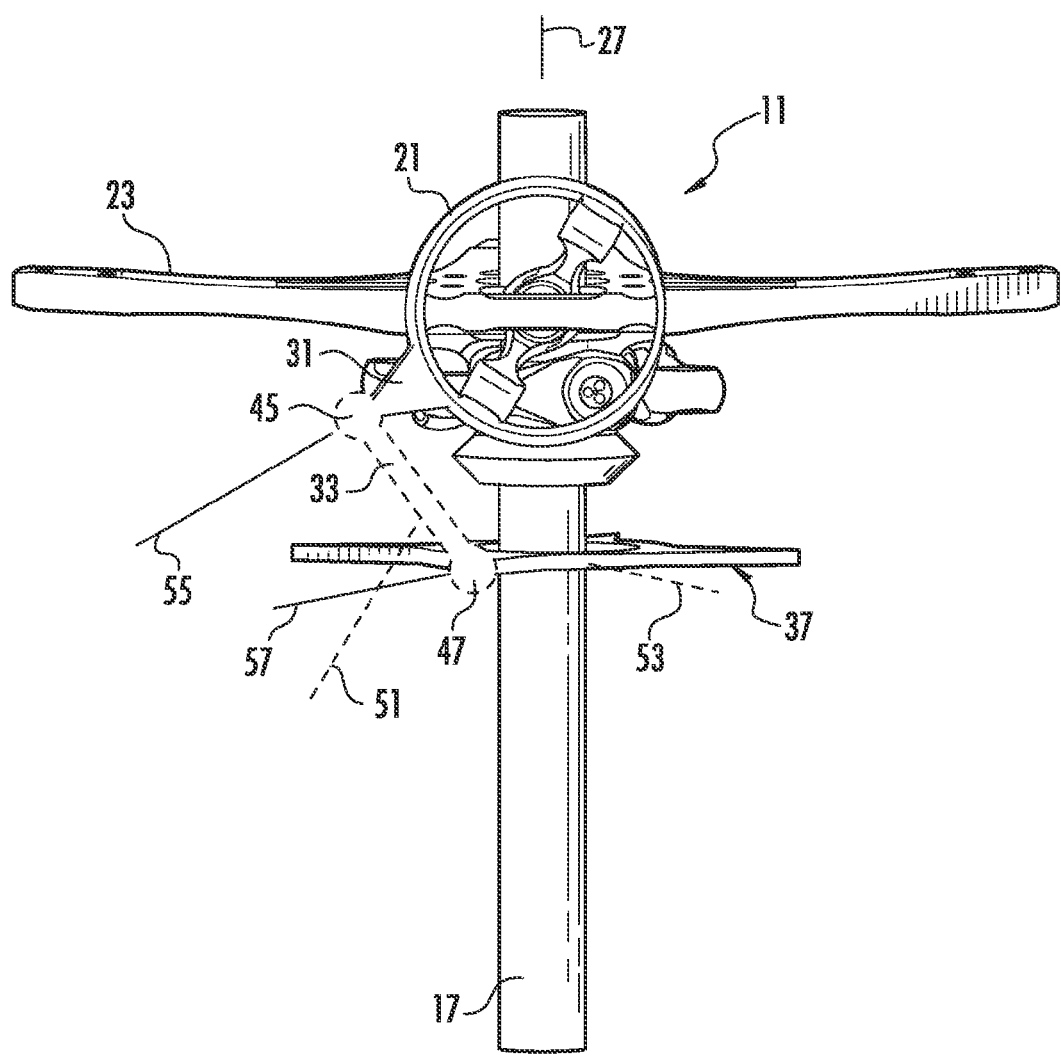
FIG. 4 is a side view of the rotor hub assembly of FIG. 3, the blade-pitch control system being shown in the minimum-pitch collective position.
Figure 5:
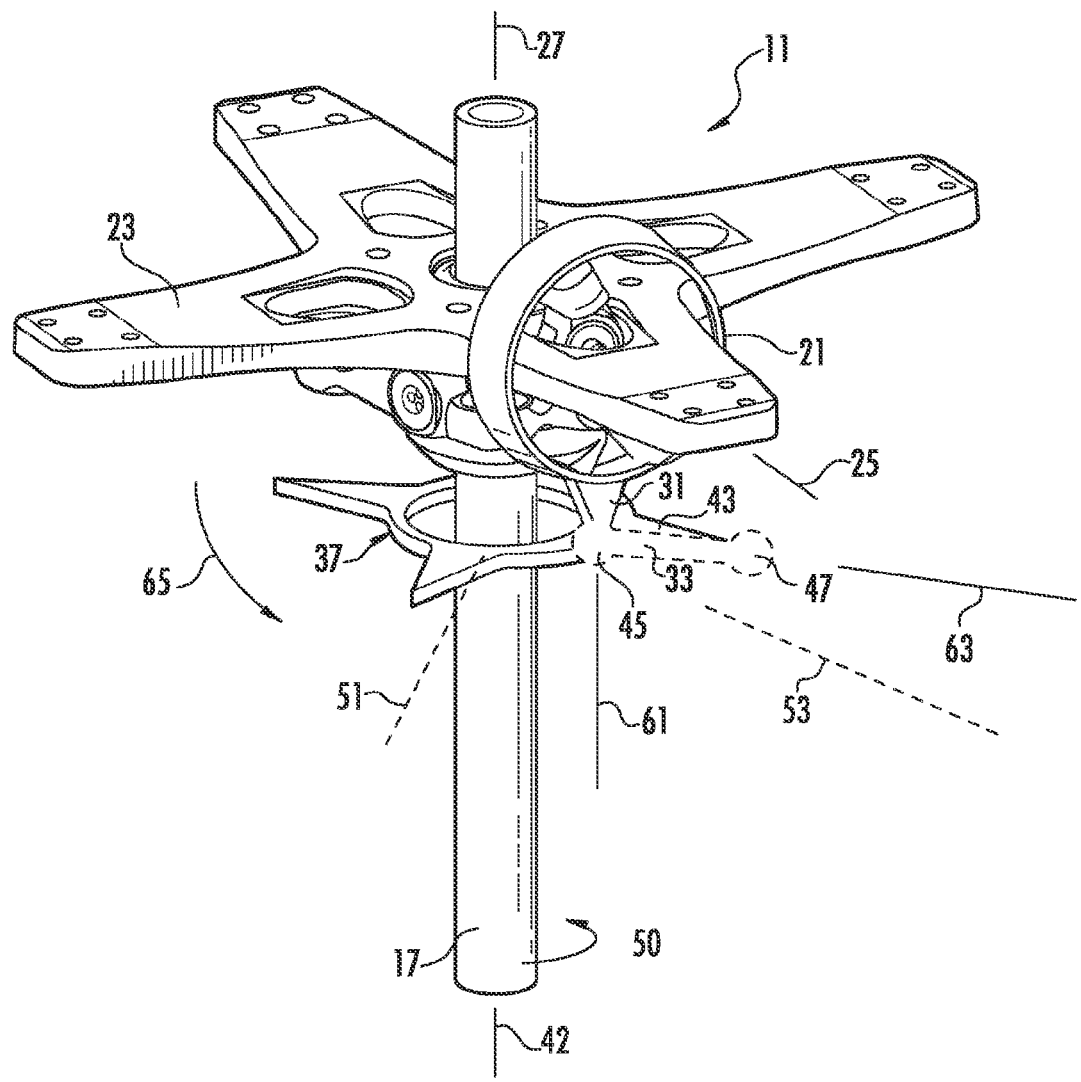
FIG. 5 is an oblique view of the rotor hub assembly of FIG. 3, the blade-pitch control system being shown in a maximum-pitch collective position.
Figure 6:
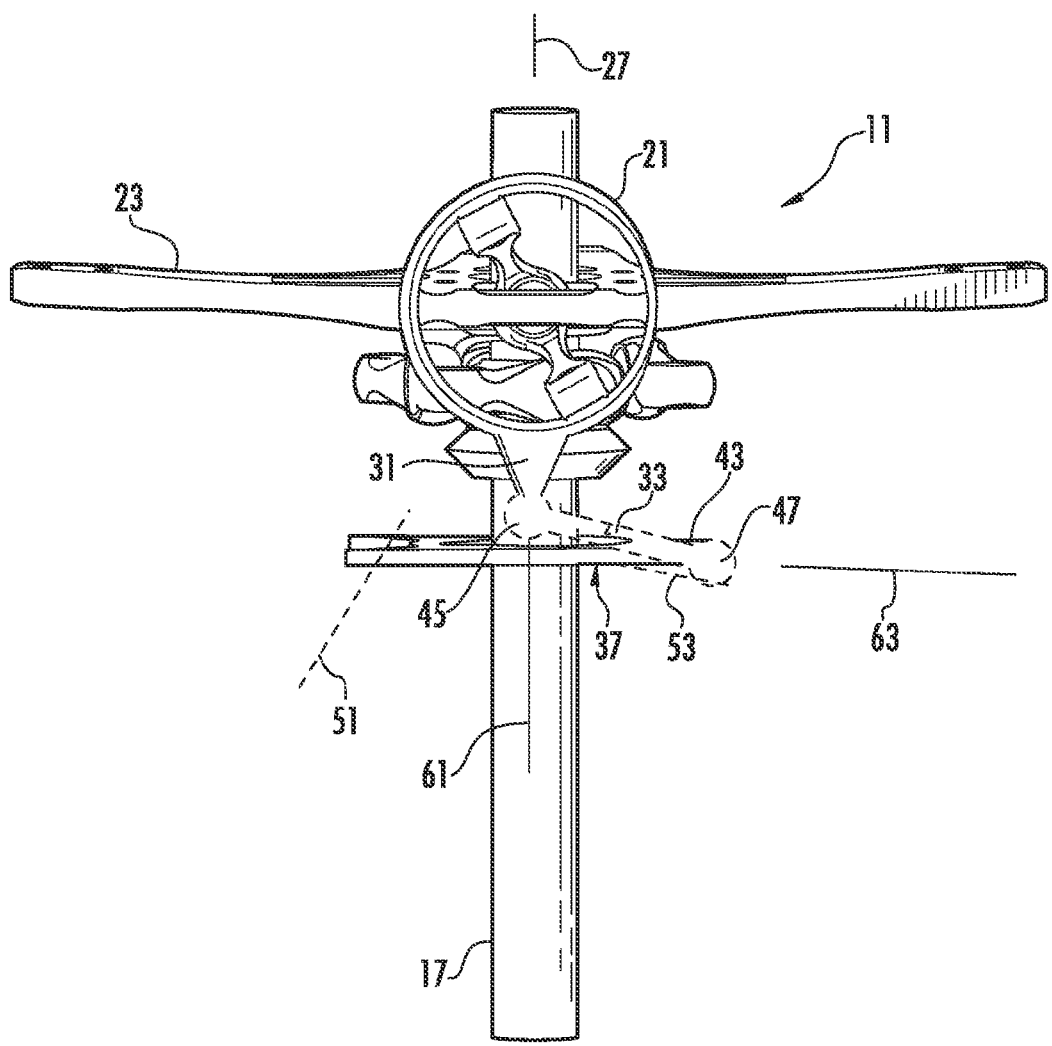
FIG. 6 is a side view of the rotor hub assembly of FIG. 3, the blade-pitch control system being shown in the maximum-pitch collective position.

FIGS. 3 through 6 are views of rotor hub assembly 11 with non-rotating swashplate 39 and all but one blade grip 21 and associated link 33 removed. FIGS. 3 and 4 show control system 19 in a minimum-pitch configuration, and FIGS. 5 and 6 show system 19 in a maximum-pitch configuration. In each of these configurations, swashplate axis 42 is generally coaxial with mast axis 27, and yoke 23 is in a nominal position relative to mast 17, wherein the plane of yoke 23 is generally normal to mast axis 27. For reference in these views, lines are provided for indicating various positions of pitch horn 31 and arm 43. For example, line 51 is an imaginary line extending radially from pitch horn 31 when pitch horn 31 is in the position located at the midpoint of its range of motion. Likewise, line 53 is an imaginary line extending radially from arm 43 when arm 43 is in the position located at the midpoint of its range of motion. Control system 19 may be configured to have a nominal position in which pitch horn 31 and arm 43 are located at the positions shown by lines 51, 53, respectively, but the nominal position may alternatively be selected to provide for more available travel to one side or the other of the selected nominal position.

During operation, rotating swashplate 37 is driven in rotation about swashplate axis 42 by a linkage, such as the linkage shown in FIGS. 11 and 12 and described below, connecting rotating swashplate 37 to mast 17 or yoke 23. To provide for control of the collective pitch angle of grips 21 (and attached blades), swashplate 37 may be selectively indexed about swashplate axis 42 and relative to mast 17 and rotor hub 15 during rotation of swashplate 37 with rotor hub assembly 11. The relative rotation of swashplate 37 causes a corresponding movement of each link 33, which causes pitch horn 31 to rotate about the associated pitch axis 25 and changes the pitch angle of the attached blade. The indexing of rotating swashplate 37 may be accomplished by any appropriate means, such as by electric motors and/or mechanical linkage. It should be noted that in one embodiment rotating swashplate 37 may be attached to mast 17.

FIGS. 3 and 4 are oblique and side views, respectively, of rotor hub assembly 11, and these views show blade-pitch control system 19 in a minimum blade-pitch configuration. In this configuration, pitch horn 31 is located at its uppermost location, the position of which is indicated by line 55, and arm 43 is positioned at the trailing end (relative to the direction of rotation of assembly 11) of its range of travel, the position of which is indicated by line 57. This configuration is achieved by indexing swashplate 37 relative to yoke 23 by rotating swashplate 37 in the direction shown by arrow 59, which is opposite to the direction of rotation of assembly 11 shown by arrow 50.

FIGS. 5 and 6 are oblique and side views, respectively, of rotor hub assembly 11, and these views show blade-pitch control system 19 in a maximum blade-pitch configuration. In this configuration, pitch horn 31 is located at its lowermost location, the position of which is indicated by line 61, and arm 43 is positioned at the leading end (relative to the direction of rotation of assembly 11) of its range of travel, the position of which is indicated by line 63. This configuration is achieved by indexing swashplate 37 relative to yoke 23 by rotating swashplate 37 in the direction shown by arrow 65, which is in the same direction as the rotation of assembly 11.

Figure 7:
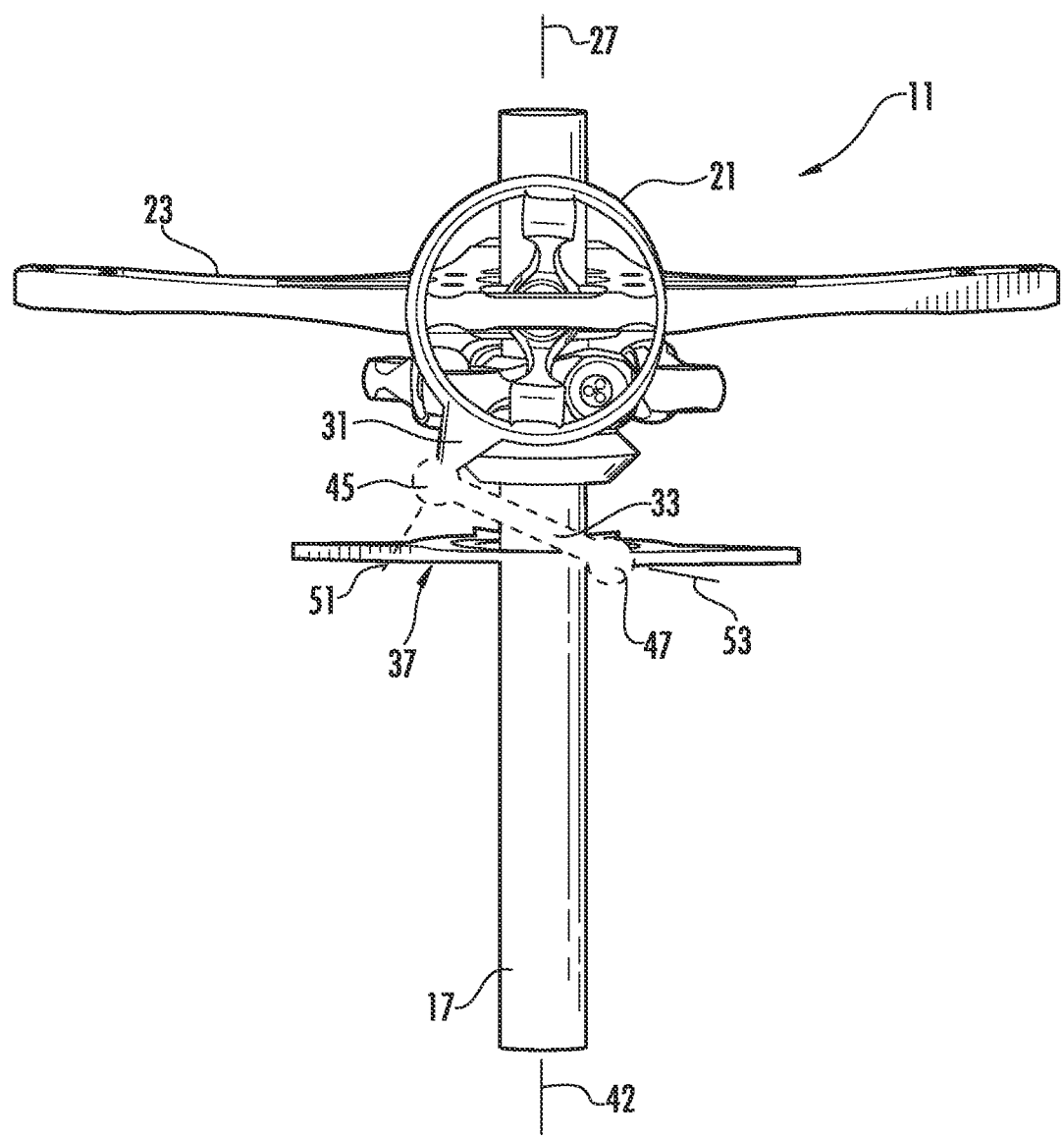
FIG. 7 is a side view of the rotor hub assembly of FIG. 3, the blade-pitch control system being shown in an intermediate-pitch collective position.
Figure 8:
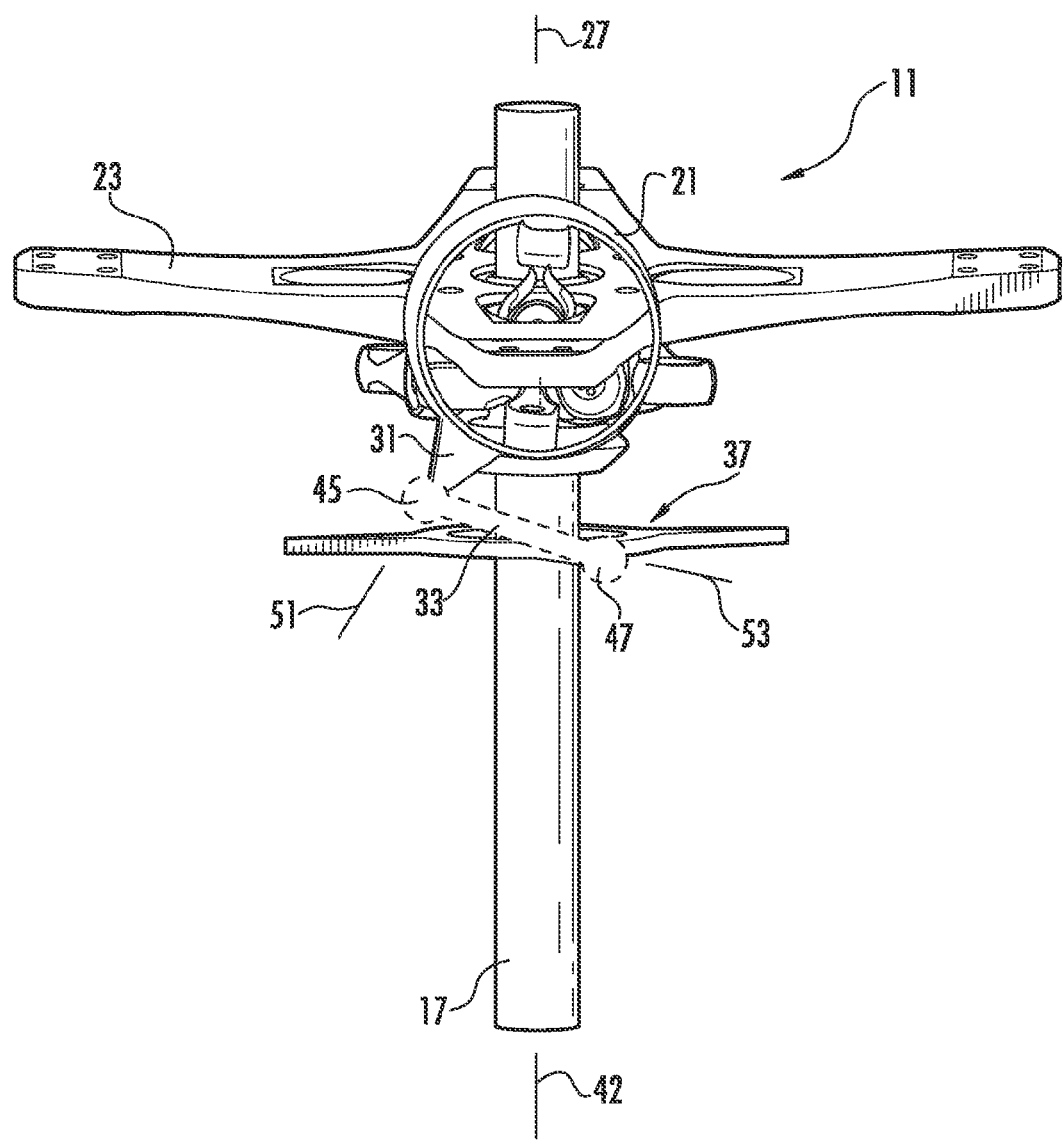
FIG. 8 is a side view of the rotor hub assembly of FIG. 3, the blade-pitch control system being shown in the intermediate-pitch collective position, the rotor hub being shown as gimbaled relative to the mast.

One advantage of using control system 19 in a gimbaled tiltrotor hub, in which the yoke gimbals relative to the mast, is a reduced pitch-flap coupling parameter (delta-3) in high collective (high blade pitch) configurations, such as when the tiltrotor is flown in airplane mode. In addition, low collective (low pitch) configurations, such as those used in helicopter mode, provide for an increased delta-3 parameter, which is desirable. In other words, gimballing of yoke 23 due to flapping has less of an effect on the pitch of the rotor blades when the blades are in a high-pitch position than in a typical pitch-control system. This improved effect can be seen in FIGS. 7 and 8, which are side views of rotor hub assembly 11. In the figures, blade-pitch control system 19 is shown in an intermediate-pitch position, wherein pitch horn 31 is aligned with line 51 (in FIG. 7 only) and arm 43 (obscured in the views) is aligned with line 53. FIG. 7 shows yoke 23 in a nominal position, wherein the plane of yoke 23 is generally normal to mast 17, whereas FIG. 8 shows yoke 23 gimbaled relative to mast 17 about a flapping axis.

When yoke 23 gimbals relative to mast 17, at least one blade grip 21 is moved toward swashplate 37 and at least one blade grip 21 on the opposite side of yoke 23 is moved away from swashplate 37. In a typical, prior-art pitch control system, the pitch horn is actuated by a generally vertical pitch link, such that gimballing of the yoke leads to large changes in the pitch angle of the blades. However, control system 19 provides for minimum change in blade pitch due to the inclined orientation of pitch link 33. As can be seen in FIG. 8, there is a minimum of change in position of pitch horn 31 when yoke 23 gimbals, as much of the motion is absorbed through rotation of link 33 relative to swashplate 37 and pitch horn 31 about joints 45, 47, though the pitch angle of grip 21 is slightly reduced due to the gimballing. The improved effect is less pronounced when control system 19 is in a low collective configuration.

In addition to collective pitch control, control system 19 can be used to provide cyclic pitch control of grips 21 in at least three ways. One method is to laterally translate, or shuttle, swashplate assembly 35 relative to mast 17 in a plane generally normal to mast 17, so that mast axis 27 and swashplate axis 42 remain generally parallel but not coaxial. Another method to provide cyclic control is to tilt swashplate assembly 35 relative to mast 17 about axes generally perpendicular to axis 42, so that swashplate axis 42 is angled relative to mast axis 27, though this method may provide less input movement when used with vertical pitch horns 31. Though the methods just described involve only translational or tilting motions, a third method for cyclic control is to move swashplate assembly 35 in a combination of translation and tilting motions.

Figure 9:
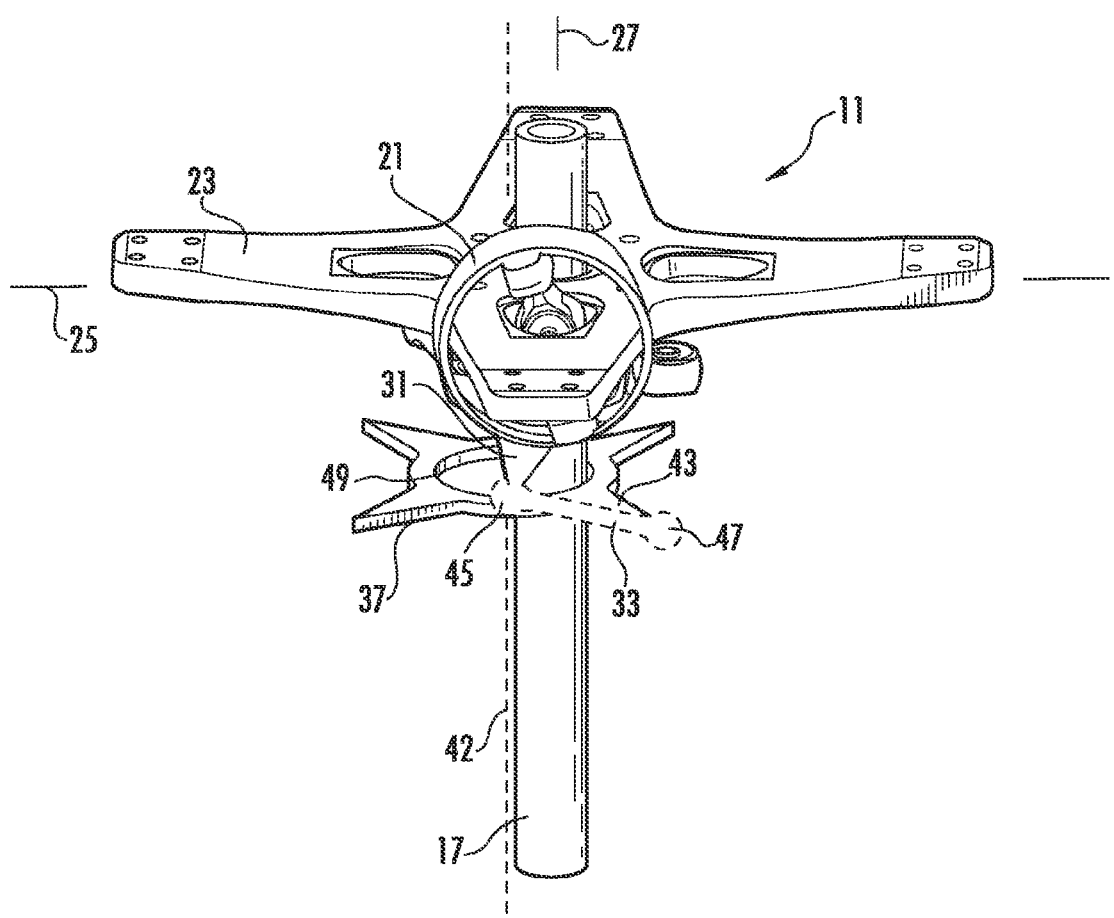
FIG. 9 is a side view of the rotor hub assembly of FIG. 3, the blade-pitch control system being shown in a cyclic pitch position.

FIG. 9 is a side view of rotor hub assembly 11, and blade-pitch control system 19 is shown in a configuration providing cyclic blade-pitch control through translation of swashplate 37. Swashplate 37 is shown displaced relative to mast 17 in a plane generally normal to mast 17, so that mast axis 27 and swashplate axis 42 remain generally parallel but not coaxial. As yoke 23 and swashplate 37 rotate together about mast axis 27 and swashplate axis 42, respectively, the distance between pitch horns 31 and arms 43 varies in a sinusoidal manner, causing cyclic pitch-angle changes of each grip 21 and the blade attached to each grip 21. The amount of cyclic input is determined by the amount of displacement of axis 42 from the position of coaxial orientation with mast axis 27, and the limit of the available cyclic input is determined by the size of aperture 49 of swashplate 37. The size of aperture 49 defines the limit of translation before swashplate 37 contacts mast 17, and FIG. 9 shows swashplate 37 in a maximum-pitch cyclic position.

Figure 10:
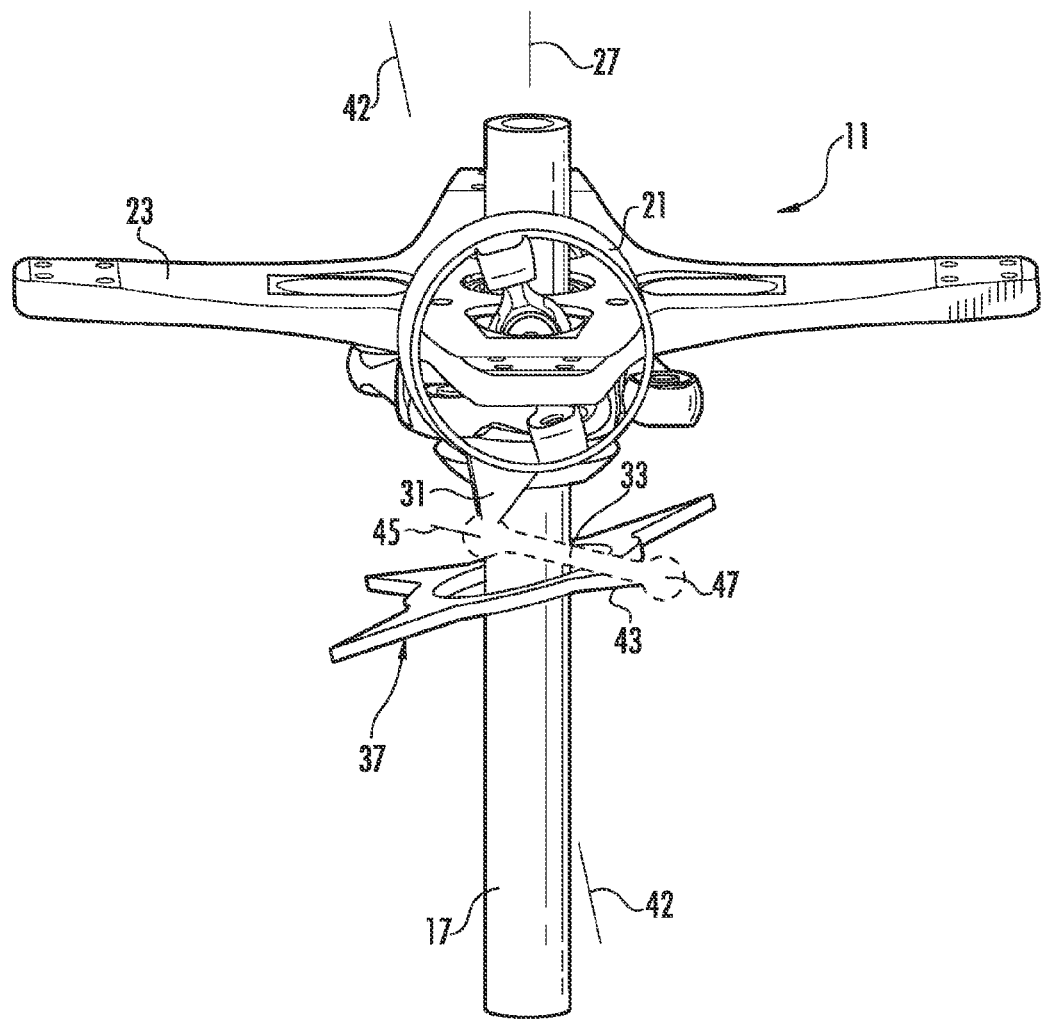
FIG. 10 is a side view of the rotor hub assembly of FIG. 3, the blade-pitch control system being shown in an alternative cyclic pitch position.

FIG. 10 is a side view of rotor hub assembly 11, and blade-pitch control system 19 is shown in an alternative configuration providing cyclic blade-pitch control through tilting of swashplate 37. Swashplate 37 is shown tilted relative to mast 17 about an axis that is generally perpendicular to swashplate axis 42, so that swashplate axis 42 is oriented at an angle relative to mast axis 27. As yoke 23 and swashplate 37 rotate together about mast axis 27 and swashplate axis 42, respectively, the distance between pitch horns 31 and arms 43 varies in a sinusoidal manner, causing cyclic pitch-angle changes of each grip 21 and the blade attached to each grip 21. The amount of cyclic input is determined by the amount of tilting of axis 42 from the position of coaxial orientation with mast axis 27, and the limit of the available cyclic input is determined by the size of aperture 49 of swashplate 37. The size of aperture 49 defines the limit of tilting before swashplate 37 contacts mast 17.

Figure 11:
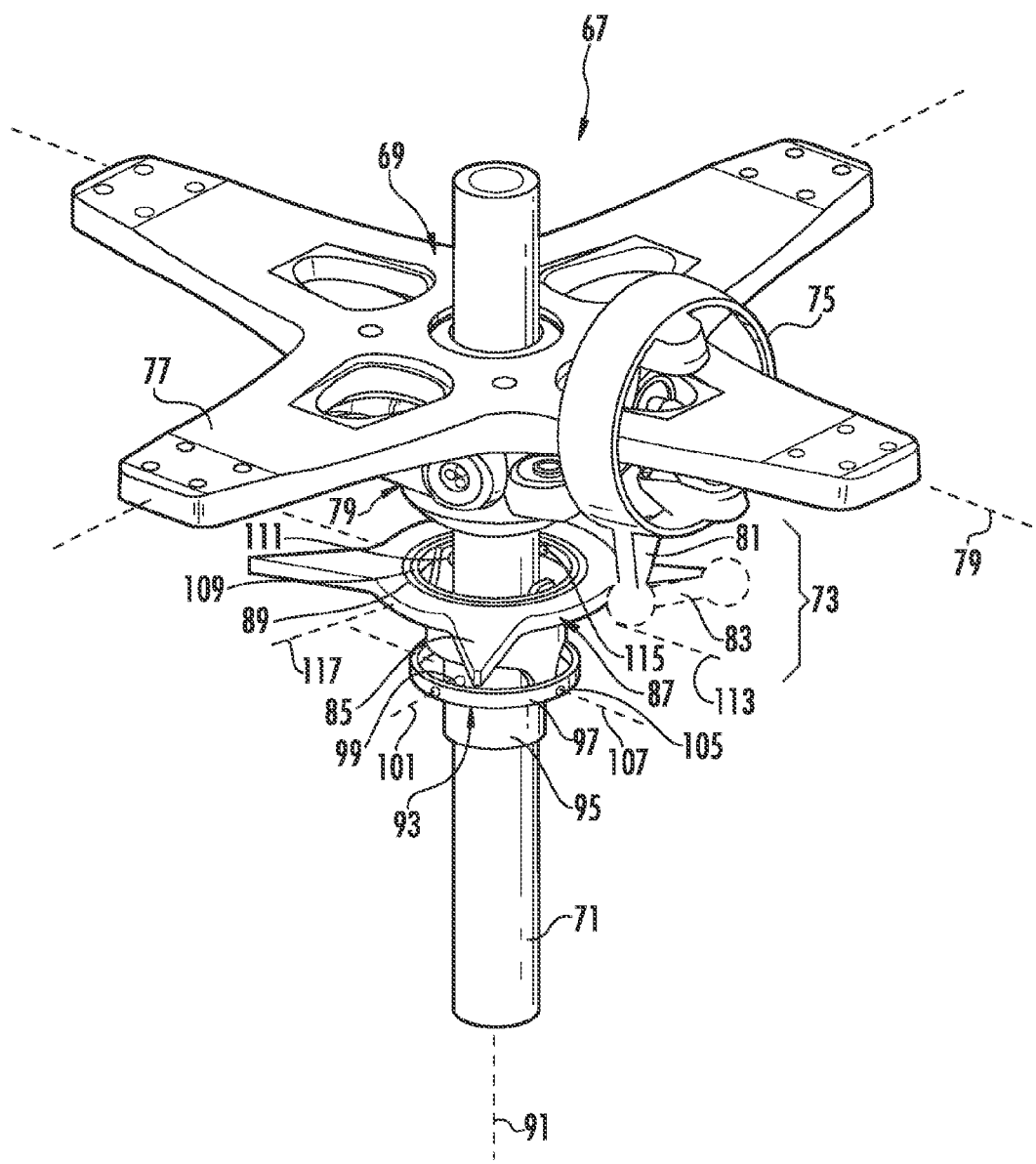
FIG. 11 is an oblique view of a rotor hub assembly, comprising an alternative embodiment of a blade-pitch control system.
Figure 12:
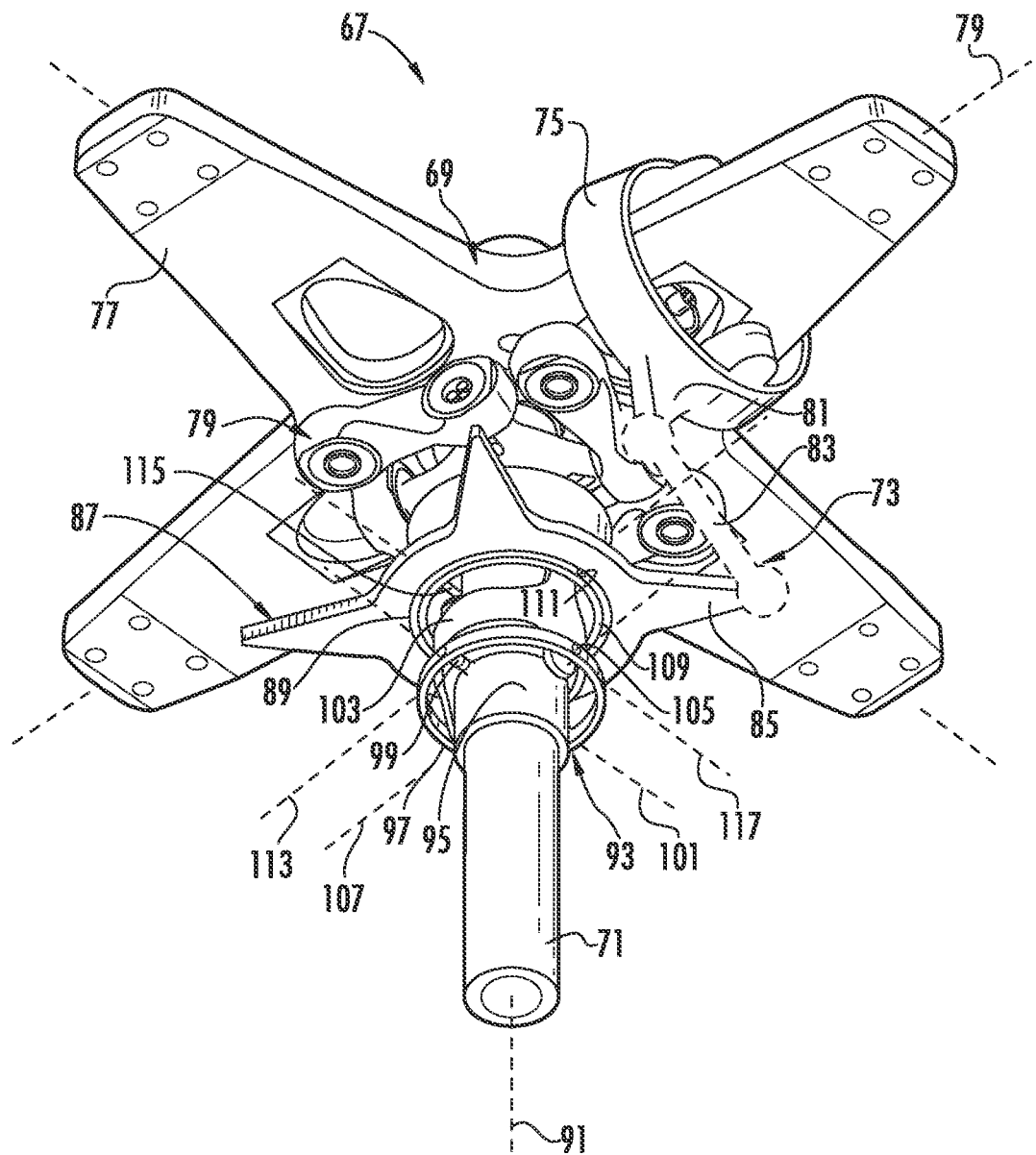
FIG. 12 is an oblique view of the rotor hub assembly of FIG. 12.

FIGS. 11 and 12 illustrate an embodiment of a rotor hub assembly 67, such as for a helicopter or tiltrotor, constructed and used similarly to hub assembly 11, which is shown and described above. FIG. 11 is an oblique view from above assembly 67, and FIG. 12 is an oblique view fro below assembly 67. Rotor hub 69 is rotated using mast 71, and an embodiment of a blade-pitch control system 73 is provided for controlling the pitch of blade grips 75 using both translation and tilting of a swashplate assembly. Rotor blades (not shown) are attached to grips 75 (only the inner portion of one grip 75 is shown assembled onto assembly 67), and each blade and grip 75 are rotatably attached to a yoke 77 to allow for adjustability of pitch angle about a corresponding pitch axis 79. Yoke 77 is attached to mast 71 with a constant-velocity joint assembly 79, which allows yoke 77 to gimbal relative to mast 71 while mast 71 drives yoke 77 in rotation. While shown as being configured for four blades, other embodiments of rotor hub assembly 67 may be configured for any number of blades.

Each grip 75 has a pitch horn 81 extending generally radially from grip 75, and a pitch link 83 pivotally connects each pitch horn 81 to an arm 85 of a rotating swashplate 87 portion of a swashplate assembly. As described above, a swashplate assembly has a non-rotating swashplate that controls the motion of rotating swashplate 87 while rotating swashplate 87 continuously rotates with mast 71 and the remainder of hub assembly 67. Mast 71 extends through an aperture 89 in rotating swashplate 87, and the relatively large size of aperture 89 allows for tilting and translation of swashplate 87 relative to mast 71.

During operation, rotating swashplate 87 is driven in rotation about a swashplate axis 91 (coaxial with mast 71 in the orientation shown) by linkage 93, which connects rotating swashplate 87 to mast 71. To provide for control of the collective pitch angle of grips 75 (and attached blades), swashplate 87 may be selectively indexed about swashplate axis 91 and relative to mast 71 during rotation of swashplate 87 with rotor hub assembly 67. The relative rotation of swashplate 87 causes a corresponding movement of each link 83, which causes pitch horn 81 to rotate about the associated pitch axis 79 and changes the pitch angle of the attached blade. To provide for control of the cyclic pitch angle of grips 75, swashplate 87 may be selectively tilted and shuttled (along with swashplate axis 91) relative to mast 71 during rotation of swashplate 87 with rotor hub assembly 67.

Linkage 93 comprises a driver 95 that is rotatably mounted to mast 71, allowing for coaxial, indexing rotation about mast 71 while mast 71 continuously drives driver 95 in rotation with mast 71. During rotation with mast 71, driver 95 may be indexed about mast 71 using any appropriate means (not shown), such as electric motors, gear mechanisms, or similar drive means. A first gimbal ring 97 is rotatably connected to driver 95 on opposing pins 99, which form axis 101, allowing first gimbal ring 97 to rotate relative to driver 95 about axis 101. A torque tube 103 encircles mast 71 and is rotatably connected to first gimbal ring 97 at pins 105, which form axis 107, allowing torque tube 103 to rotate relative to first gimbal ring 105 about axis 107. Mast 71 extends through torque tube 103 with enough space between them to allow for limited tilting of torque tube 103 relative to mast 71.

A second gimbal ring 109 is used to connect torque tube 103 to rotating swashplate 87. Second gimbal ring 109 is rotatably connected to torque tube 103 at pins 111, which form axis 113, allowing second gimbal ring 109 to rotate relative to torque tube 103 about axis 113. Rotating swashplate 87 is rotatably connected to second gimbal ring 109 at pins 115, which form axis 117, allowing rotating swashplate 87 to rotate relative to second gimbal ring 109 about axis 117.

During operation, linkage 93 transmits torque from mast 71 into first gimbal ring 105, then into torque tube 103, then into second gimbal ring 109, then into rotating swashplate 87 for driving swashplate 87 with hub assembly 67. Driver 95 may be selectively indexed about mast 71 for changing the relative angular position of rotating swashplate about swashplate axis 91 and relative to yoke 77, allowing for collective pitch control for grips 75 and the attached blades. In addition, linkage 93 allows a non-rotating swashplate (not shown) of the swashplate assembly to cyclically control pitch through translation and tilting of the plane of rotation of rotating swashplate 87.

The rotor-blade control system provides for several advantages, including: (1) improved kinematics for use on gimbaled hub applications, especially for tiltrotor aircraft; and (2) improved packaging considerations through the elimination of a rise and fall swashplate.

This description includes reference to an illustrative embodiment, but it is not intended to be construed in a limiting sense. Various modifications and combinations of the illustrative embodiment, as well as other embodiments, will be apparent to persons skilled in the art upon reference to the description.

The invention claimed is:

1. A blade-pitch control system for controlling a pitch angle of each blade of a rotor, the control system comprising:
   a rotating swashplate adapted for continuous rotation with an associated rotor and mast during rotation of the rotor and mast about a first axis of rotation, the rotating swashplate being configured for rotation about a second axis of rotation; and
   at least one link adapted for connecting the rotating swashplate to each blade of the rotor;
   wherein the rotating swashplate is configured to provide for collective control of the pitch angle of the blades through selective indexing of the rotating swashplate about the second axis of rotation and relative to the rotor and mast while the rotating swashplate is rotating with the rotor and mast; and
   wherein the first axis of rotation and the second axis of rotation are selectively coaxial.

2. The blade-pitch control system according to claim 1, wherein the rotating swashplate lies in a plane that is generally normal to the first axis of rotation.

3. The blade-pitch control system according to claim 1, wherein the rotating swashplate lies in a plane that is generally normal to the first axis of rotation, and wherein the swashplate remains in a generally fixed planar orientation relative to the first axis of rotation during operation.

4. The blade-pitch control system according to claim 1, wherein the rotating swashplate lies in a plane that is generally normal to the first axis of rotation, and wherein the rotating swashplate is configured to translate generally within the plane for providing cyclic control of the pitch angle of each blade.

5. The blade-pitch control system according to claim 1, wherein the rotating swashplate is configured to tilt about axes generally perpendicular to the second axis for providing cyclic control of the pitch angle of each blade.

6. The blade-pitch control system according to claim 1, wherein the swashplate is configured to translate and tilt for providing cyclic control of the pitch angle of each blade.

7. A blade-pitch control system for controlling a pitch angle of blades of a rotor, the control system comprising:
- a rotating swashplate adapted for continuously rotating with an associated rotor and mast during rotation of the rotor and mast about a first axis of rotation, the rotating swashplate being configured for rotation about a second axis of rotation, a plane defined by the rotating swashplate being generally normal to the first axis; and
- at least one link adapted for connecting the rotating swashplate to each blade of the rotor;
- wherein the rotating swashplate is configured to provide for collective control of the pitch angle of the blades through selective indexing of the rotating swashplate about the second axis and relative to the rotor and mast while the rotating swashplate is rotating with the rotor and mast;
- wherein the rotating swashplate is configured to provide for cyclic control of the pitch angle of the blades through selective translation of the rotating swashplate within the plane and relative to the rotor and mast, the rotating swashplate remaining in a generally fixed planar orientation relative to the first axis, and the first and second axes remaining generally parallel; and
- wherein the first axis of rotation and the second axis of rotation are selectively coaxial.

8. A blade-pitch control system for controlling a pitch angle of blades of a rotor, the control system comprising:
- a rotating swashplate adapted for continuously rotating with an associated rotor and mast during rotation of the rotor about a first axis of rotation, the rotating swashplate being configured for rotation about a second axis of rotation; and
- at least one link adapted for connecting the swashplate to each blade of the rotor;
- wherein the rotating swashplate is configured to provide for collective control of the pitch angle of the blades through selective indexing of the rotating swashplate about the second axis and relative to the rotor and mast while the rotating swashplate is rotating with the rotor and mast; and
- wherein the rotating swashplate is configured to provide for cyclic control of the pitch angle of the blades through selective translation and tilting of the rotating swashplate.

9. A method of controlling pitch angle of blades of a rotor; comprising:
- (a) providing a rotating swashplate configured for continuous rotation with a rotor during rotation of the rotor about a first axis of rotation, the swashplate being configured for rotation about a second axis of rotation and being connected to each blade for controlling the pitch angle of each blade;
- (b) during rotation with the rotor, selectively indexing the rotating swashplate about the second axis and relative to the rotor for causing a collective change in pitch angle of the blades;
- wherein the first axis of rotation and the second axis of rotation are selectively coaxial.

10. The method of claim 9, further comprising:
- (c) during rotation with the rotor, selectively translating the rotating swashplate relative to the rotor for causing a cyclic change in pitch angle of the blades, the first and second axes remaining generally parallel.

11. The method of claim 9, further comprising:
- (d) during rotation with the rotor, selectively tilting the rotating swashplate about an axis generally perpendicular to the second axis for causing a cyclic change in pitch angle of the blades.

12. The method of claim 9, further comprising:
- (e) during rotation with the rotor, selectively indexing and tilting the rotating swashplate for causing a cyclic change in pitch angle of the blades.

* * * * *